(12) United States Patent
Suzuki et al.

(10) Patent No.: US 9,909,656 B2
(45) Date of Patent: Mar. 6, 2018

(54) CONVEYING DEVICE DRIVABLE BY RACK GEAR

(71) Applicant: Daifuku Co., Ltd., Osaka (JP)

(72) Inventors: Takaharu Suzuki, Shiga (JP); Yoshikazu Hirokari, Shiga (JP)

(73) Assignee: Daifuku Co., Ltd. (JP)

( * ) Notice: Subject to any disclaimer, the term of this patent is extended or adjusted under 35 U.S.C. 154(b) by 0 days.

(21) Appl. No.: 15/360,638

(22) Filed: Nov. 23, 2016

(65) Prior Publication Data
US 2017/0152925 A1    Jun. 1, 2017

(30) Foreign Application Priority Data
Dec. 1, 2015  (JP) .................................. 2015-234779

(51) Int. Cl.
| | | |
|---|---|---|
| *F16H 19/04* | (2006.01) | |
| *B65G 17/12* | (2006.01) | |
| *B65G 17/00* | (2006.01) | |
| *B65G 19/02* | (2006.01) | |

(52) U.S. Cl.
CPC ............ *F16H 19/04* (2013.01); *B65G 17/005* (2013.01); *B65G 17/12* (2013.01); *B65G 19/02* (2013.01); *F16H 2019/046* (2013.01)

(58) Field of Classification Search
CPC ....................................................... F16H 19/04
See application file for complete search history.

(56) References Cited

U.S. PATENT DOCUMENTS

| | | | | |
|---|---|---|---|---|
| 2,410,643 | A * | 11/1946 | Fielding | F16H 55/26 74/422 |
| 4,597,352 | A * | 7/1986 | Norminton | B63G 8/42 114/254 |
| 4,723,356 | A * | 2/1988 | Sakamoto | B23P 21/004 198/341.05 |
| 5,165,348 | A * | 11/1992 | Wakabayashi | B61C 13/04 105/29.1 |
| 6,155,310 | A * | 12/2000 | Haubert | B21F 33/04 140/3 CA |
| 7,891,479 | B2 * | 2/2011 | Evangelista | B65G 41/008 198/312 |

(Continued)

FOREIGN PATENT DOCUMENTS

JP   H0874961 A   3/1996
JP   2006038190 A  2/2006

*Primary Examiner* — Thomas Randazzo
(74) *Attorney, Agent, or Firm* — St. Onge Steward Johnston & Reens LLC (57) ABSTRACT

A conveying device drivable by rack gear has a towed hook further forward than a front end of a rack gear mounted to a conveying traveling body. A driving pinion gear, disposed at an entrance of a rack gear drive section, has a drawing-in claw that engages the towed hook and draws in the conveying traveling body to a position where the front end of the rack gear meshes with the driving pinion gear. The towed hook has, at a position at a rear side of a hook portion at a distal end thereof and further forward than the front end of the rack gear, an advance preventing claw portion disposed continuous thereto that, together with the hook portion, sandwiches the drawing-in claw, and the hook portion has a length such that it enters more deeply inside a rotation locus of the drawing-in claw than the advance preventing claw portion.

6 Claims, 8 Drawing Sheets

(56) References Cited

U.S. PATENT DOCUMENTS

| | | | |
|---|---|---|---|
| 8,011,491 B2* | 9/2011 | Nakagawa | B62D 65/18 198/346.2 |
| 8,459,438 B2* | 6/2013 | Ooe | B62D 65/18 198/345 |
| 8,522,636 B2* | 9/2013 | Uchida | F16H 19/04 74/413 |
| 8,708,310 B2* | 4/2014 | Edgerly | E04F 21/22 254/11 |
| 9,408,765 B2* | 8/2016 | Andersson | A61G 7/1015 |

* cited by examiner

CONVEYING DEVICE DRIVABLE BY RACK GEAR

FIELD OF THE INVENTION

The present invention relates to a conveying device drivable by rack gear with which a conveying traveling body can be driven to travel, just within a specific section in a traveling route of the conveying traveling body, by a rack gear, mounted to the conveying traveling body, and a driving pinion gear, provided at the traveling route side so as to mesh with the rack gear.

BACKGROUND OF THE INVENTION

As examples of this type of conveying device drivable by rack gear, conveying devices described in Japanese Published Unexamined Patent Application No. H8-74961 (Patent Literature 1) and Japanese Published Unexamined Patent Application No. 2006-38190 (Patent Literature 2) are known. The configurations described in Patent Literature 1 and Patent Literature 2 are for making a forwardly moving rack gear mesh smoothly with a driving pinion gear pivotally supported at a fixed position, and with the configuration described in Patent Literature 1, a towed hook (rack guide) is mounted to a front of a front end of the rack gear, a driving pinion gear is provided, at a circumference of a rotating body (pinion guide) rotating integrally with the pinion gear, with a drawing-in claw (tooth of the pinion guide) that draws in the rack gear via the towed hook, and the towed hook is engaged with the drawing-in claw in advance of the rack gear. Also, with the configuration described in Patent Literature 2, a front end portion of a rack gear is configured of a separate, vertically swingable member that includes a gear tooth row of fixed length forming the front end portion and a leading tooth of the separate member is used as a towed hook.

SUMMARY OF THE INVENTION

Both configurations described in Patent Literatures 1 and 2 have a portion, which lacks a gear tooth meshing with the rack gear, that is, have a tooth lacking portion formed at a rear side of the towed hook and are configured so that a leading gear tooth of the rack gear at the rear side begins to mesh with the pinion gear slightly delayed from a point at which the leading towed hook engages with and is drawn in by the drawing-in claw rotating integrally with the pinion gear or by one gear tooth of the pinion gear. Although such a configuration is essential for a configuration for making an incoming rack gear mesh smoothly with a rotating pinion gear, the leading towed hook may consequently move in advance so as to separate forward from the drawing-in claw or the one gear tooth of the pinion gear due to inertia when thrust is received impactingly from the drawing-in claw rotating integrally with the pinion gear or by the one gear tooth of the pinion gear. When such a situation occurs, the first gear tooth at the rear side of the tooth lacking portion becomes incapable of beginning to mesh normally with the pinion gear and breakage of the gear tooth or other problem will occur.

The present invention proposes a conveying device drivable by rack gear capable of solving the problems of the conventional art such as the above, and to describe by providing reference symbols in parentheses used in the description of embodiments below to facilitate understanding the relationship with the embodiments, the conveying device drivable by rack gear according to the present invention is a conveying device drivable by rack gear with a conveying traveling body (1), capable of traveling on a fixed traveling route, having a rack gear (9) attached in parallel to a travel direction thereof, driving pinion gears (16A and 16), meshing with the rack gear (9), disposed in a rack gear drive section (A2), in which the conveying traveling body (1) is propelled using the rack gear (9), a towed hook (17) disposed at a position further forward than a front end of the rack gear (9), and a leading driving pinion gear (16A), disposed at an entrance of the rack gear drive section (A2), being provided with a drawing-in claw (26) that engages with the towed hook (17) and draws in the conveying traveling body (1) to a position at which the front end of the rack gear (9) meshes with the leading driving pinion gear (16A), and has a configuration such that the towed hook (17) has, at a position at a rear side of a hook portion (17b) at a distal end thereof and further forward than the front end of the rack gear (9), an advance preventing claw portion (17c) disposed continuous thereto that, together with the hook portion (17b), sandwiches the drawing-in claw (26), and the hook portion (17b) has a length such that it enters more deeply inside a rotation locus of the drawing-in claw (26) than the advance preventing claw portion (17c).

With the configuration of the present invention described above, when the conveying traveling body is sent into the rack gear drive section, just a distal end portion of the towed hook at the rack gear side enters to a fixed position, that is, enters inside the rotation locus of the drawing-in claw that rotates integrally with the leading driving pinion gear and the conveying traveling body is sent in up to the fixed position, at which the advance preventing claw portion at the rear side is positioned outside the rotation locus of the drawing-in claws, so that by the drawing-in claw that rotates so as to approach the towed hook from a rear side of the towed hook, the conveying traveling body is drawn via the towed hook and the rack gear into the rack gear drive section and, at the same time, the advance preventing claw portion positioned at the rear side of the towed hook is also made to enter inside the rotation locus of the drawing-in claw to make the drawing-in claw be sandwiched between the towed hook and the advance preventing claw portion so that even if a situation occurs where the towed hook advances in front of the drawing-in claw as described above, the advance preventing claw portion contacts the drawing-in claw from the rear side and the towed hook can thus be forcibly suppressed from advancing in front of the drawing-in claw. A situation where the towed hook is drawn in at a fixed speed by the drawing-in claw is thus realized reliably and an action that is as predetermined, that is, an action of smoothly introducing a leading gear tooth of the rack gear between teeth of the leading driving pinion gear and beginning meshing of the rack gear and leading driving pinion gear can be performed extremely smoothly and reliably.

Specifically, in implementing the present invention, it is preferable that the towed hook (17) has its rearwardly extending base end portion be pivotally supported by a front end side portion of the rack gear (9) so as to be vertically swingable within a fixed range and be configured so that when the towed hook (17), while being disposed at a lower limit action position by a downwardly urging force, is thrusted up by the drawing-in claw (26) at the driving pinion gear (16A) side, the towed hook (17) moves upward and allows passing of the drawing-in claw (26). By incorporating this configuration, even if a situation occurs where a timing of sending of the conveying traveling body into the rack gear drive section deviates from the favorable timing described above and the towed hook at the rack gear side rides onto an upper end of the drawing-in claw of the leading driving pinion gear side, the towed hook will move upward so that excessive mutual pushing between the two components can be avoided, and the sending of the conveying traveling body into the rack gear drive section can thus be performed even more easily.

It is also preferable for the advance preventing claw portion (17c) to be a non-return structure that cannot ride over and pass the drawing-in claw (26) from the rear but allows passing of the drawing-in claw (26) from the rear. This configuration can be implemented simply by integrally connecting the advance preventing claw portion (17c) to the towed hook (17) if the towed hook (17) is pivotally supported so as to be vertically movable within a fixed range around a support shaft (19) as described above, and if a configuration where the towed hook (17) cannot move vertically with respect to the rack gear (9) is adopted, implementation is made possible by making the advance preventing claw portion (17c) be pivotally supported so as to be tiltable upwardly toward the front with respect to the towed hook (17). In either case, as long as the advance preventing claw portion (17c) has the non-return structure that cannot ride over and pass the drawing-in claw (26) from the rear but allows passing of the drawing-in claw (26) from the rear, even if, after the distal end portion of the towed hook has entered inside the rotation locus of the drawing-in claw, the traveling of the conveying traveling body progresses slightly and the advance preventing claw portion at the rear side also enters inside the rotation locus of the drawing-in claw, the advance preventing claw portion allows the passing of the drawing-in claw moving approachingly from the rear so that the drawing-in claw at the leading driving pinion gear side can be made to reliably enter between the hook portion and the advance preventing claw portion of the towed hook, and sending-in/stoppage control of the conveying traveling body up to the fixed position is also facilitated.

In implementing the configuration described above, it is preferable that a pivotally supported position of the towed hook (17) with respect to the rack gear (9) (position of the support shaft (19)) is set lower than a height of contact of the hook portion (17b) of the towed hook (17) and the drawing-in claw (26). With this configuration, when the towed hook is drawn in by the drawing-in claw, a rotational force in a direction of moving the towed hook upward (direction of disengaging the towed hook upward from the drawing-in claw) with the pivotally supported position as a fulcrum point will not be exerted and therefore, even if just gravity acting on the towed hook is utilized as the downwardly urging force that urges and holds the towed hook at the lower limit action position, the towed hook can be held at the lower limit action position reliably and despite simplifying the structure and enabling implementation at low cost in comparison to a case of using a spring force in combination, the predetermined action by the towed hook and the drawing-in claw can be realized reliably to enable the beginning of meshing of the rack gear and the leading driving pinion gear to be performed extremely smoothly and reliably.

Further, the towed hook (17) may be provided with a forced return operated portion (30), and a forced return operating portion (31) that acts on the forced return operated portion (30) not later than when the towed hook (17) enters inside the rotation locus of the drawing-in claw (26) may be disposed in the traveling route of the conveying traveling body (1) to provide a configuration where, when the towed hook (17) is not returned to the lower limit action position, the forced return operating portion (31) acts on the forced return operated portion (30) to forcibly return the towed hook (17) to the lower limit action position. With this configuration, even if, due to a temporal phenomenon, such as an increase in frictional resistance of a pivotally support portion of the towed hook, etc., the towed hook does not return to the lower limit action position when the conveyed traveling body is sent into the rack gear drive section, the towed hook can be returned forcibly to the lower limit action positon by the action of the forced return operating portion and operated portion so that the predetermined action by the towed hook and the drawing-in claw can always be realized reliably. Specifically, the above can be implemented easily by the forced return operated portion (30) being configured of a cam (30a) positioned at a lateral side of and further to the rear than the pivotally supported position of the towed hook (17) with respect to the rack gear (9) and the forced return operating portion (31) being configured of a roller (31a) that pushes up the cam (30a).

DETAILED DESCRIPTION OF THE INVENTION

In FIG. 1 to FIG. 3B, 1 is a conveying traveling body and is constituted from four trolleys 2 to 5, a load bar 6 of total length RL supported by the trolleys 2 to 5, a pair of front and rear conveyed object supporting bodies 7 and 8 supported by the load bar 6, and a rack gear 9. The load bar 6 is constituted from a central load bar unit 6a coupling together the pair of front and rear load trolleys 2 and 3, which are positioned at a middle among the trolleys 2 to 5, respective front and rear end load bar units 6b and 6c supported by the free trolleys 4 and 5 at respective front and rear ends, and a pair of front and rear coupling load bar units 6d and 6e coupling the central load bar unit 6a and the respective front and rear end load bar units 6b and 6c, and a side surface that is continuous across the total length is configured as a friction surface for friction drive.

Also, respectively between the central load bar unit 6a and the coupling load bar units 6d and 6e are interposed horizontal motion joint portions 10a and 10b, allowing horizontal swinging around vertical support shafts coupling the load trolleys 2 and 3 and the conveyed object supporting bodies 7 and 8 directly thereabove, and vertical motion joint portions 10c and 10d, allowing vertical swinging around right/left horizontal support shafts, and respectively between the coupling load bar units 6d and 6e and the respective front and rear end load bar units 6b and 6c are interposed horizontal motion joint portions 10e and 10f, allowing horizontal swinging around vertical support shafts, thereby providing a configuration enabling a horizontal curve route portion and a vertical direction gradient route portion to be incorporated in a traveling route of the conveying traveling body 1 that is configured of trolley guide rails 11 that guide the respective trolleys 2 to 5. Although a conveyed object W shown in the figures is illustrated as an automotive vehicle body that is horizontally supported by the pair of front and rear conveyed object supporting bodies 7 and 8, it may be any conveyed object W and the conveyed object supporting bodies 7 and 8 that are adapted to the conveyed object W are adopted.

Each of the pair of front and rear conveyed object supporting bodies 7 and 8 is constituted from a columnar member 12a erected further upward than the load bar 6 and a conveyed object support member 12b juxtaposed to an upper end of the columnar member 12a, an overhanging arm member 13a, extending horizontally to respective right and left sides, is disposed to continue from a lower end portion of each columnar member 12a, steadying rollers 13b, each self-rotatable around a horizontal support shaft, are pivotally supported at respective right and left ends of the overhanging arm members 13a, and at a route portion, at which steadying of the conveyed object W is necessary, are laid a pair of right and left steadying guide rails 14 by which the steadying rollers 13b are rollably supported. The rack gear 9 has vicinities of respective front and rear ends mounted to the overhanging arm members 13a in a state of being parallel to the central load bar unit 6a so as to be positioned at one side of the central load bar unit 6a in plan view (see FIG. 2) and positioned higher than the central load bar unit 6a in side view (see FIG. 1). Also, the rack gear 9 has rack gear teeth formed at a lower side face of a band plate with a vertically oriented plate surface and has a total length GL such that respective end portions extend slightly further forward and rearward than the central load bar unit 6a.

Figure 1:
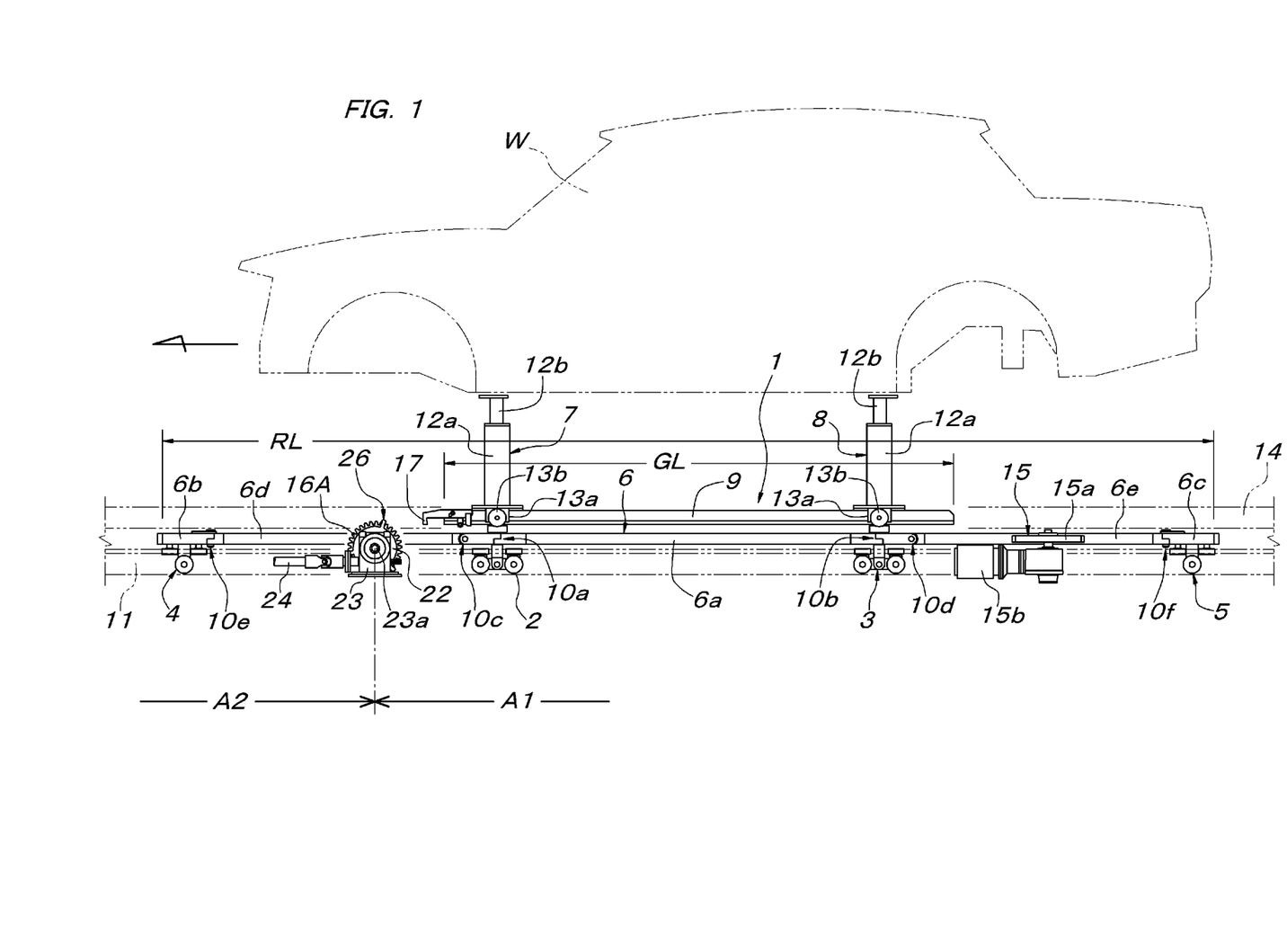
FIG. 1 is a side view for describing a connection region, between a friction drive section and a rack gear drive section, and a conveying traveling body.
Figure 2:
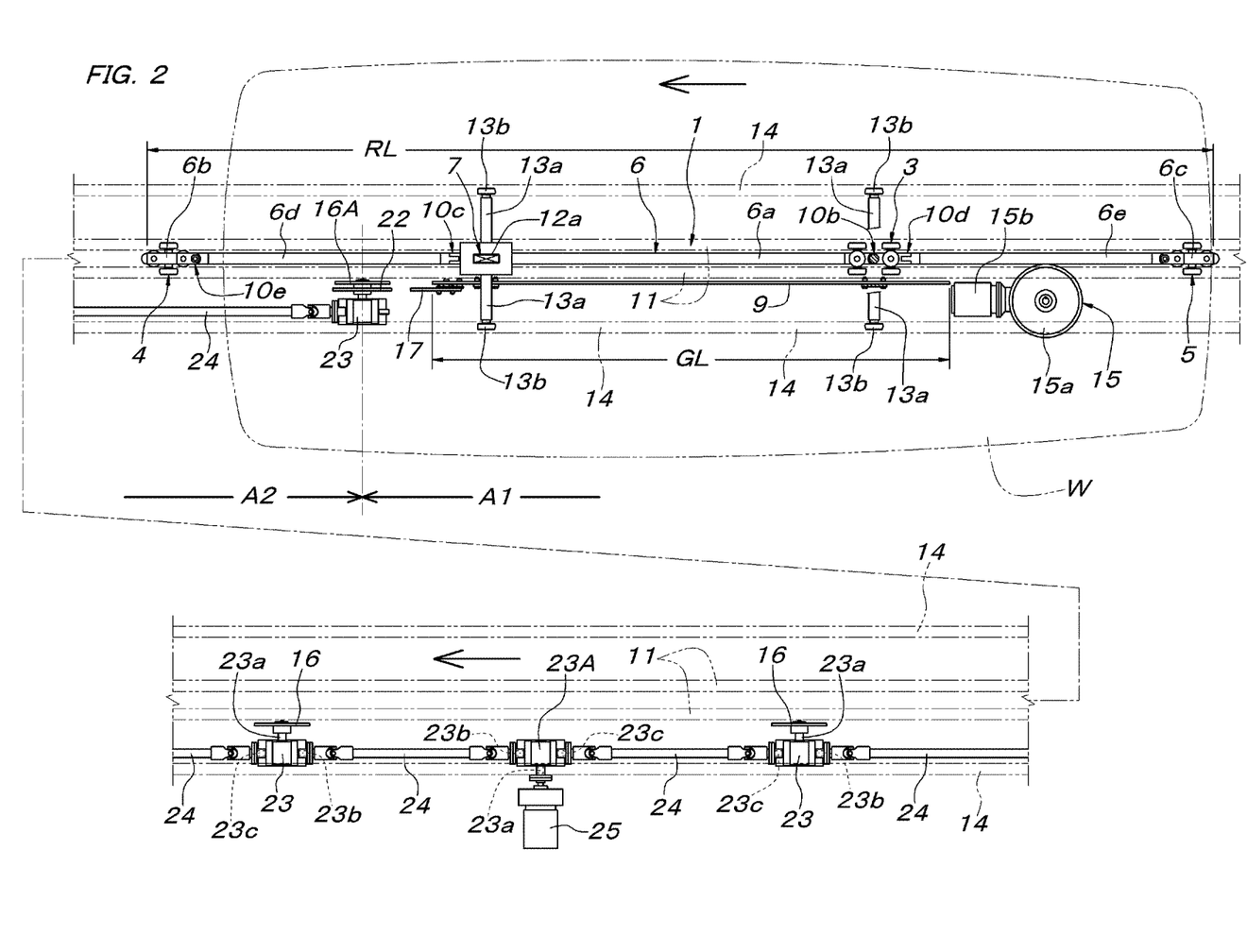
FIG. 2 is a partially lateral sectional plan view for describing the connection region, between a friction drive section and a rack gear drive section, and the conveying traveling body.
Figure 3A:
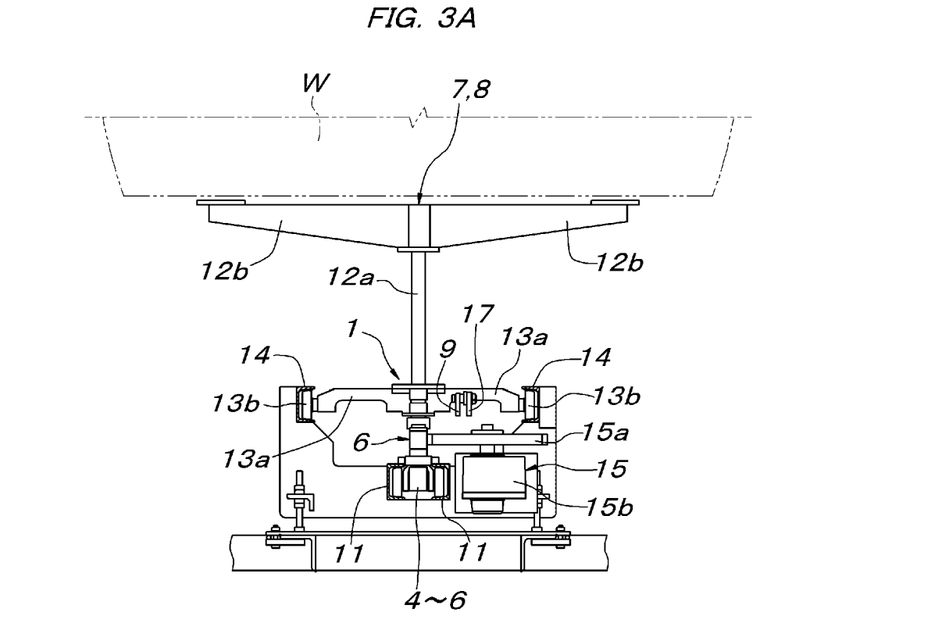
FIG. 3A is a front view showing the conveying traveling body that is being friction driven and FIG. 3B is a front view showing the conveying traveling body that is being rack gear driven.
Figure 3B:
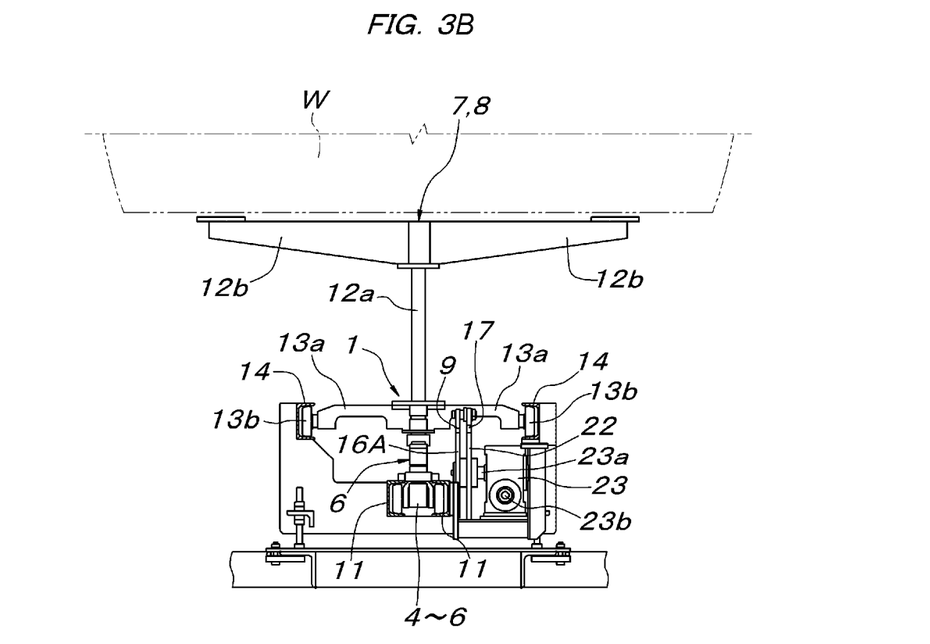
Figure 4A:
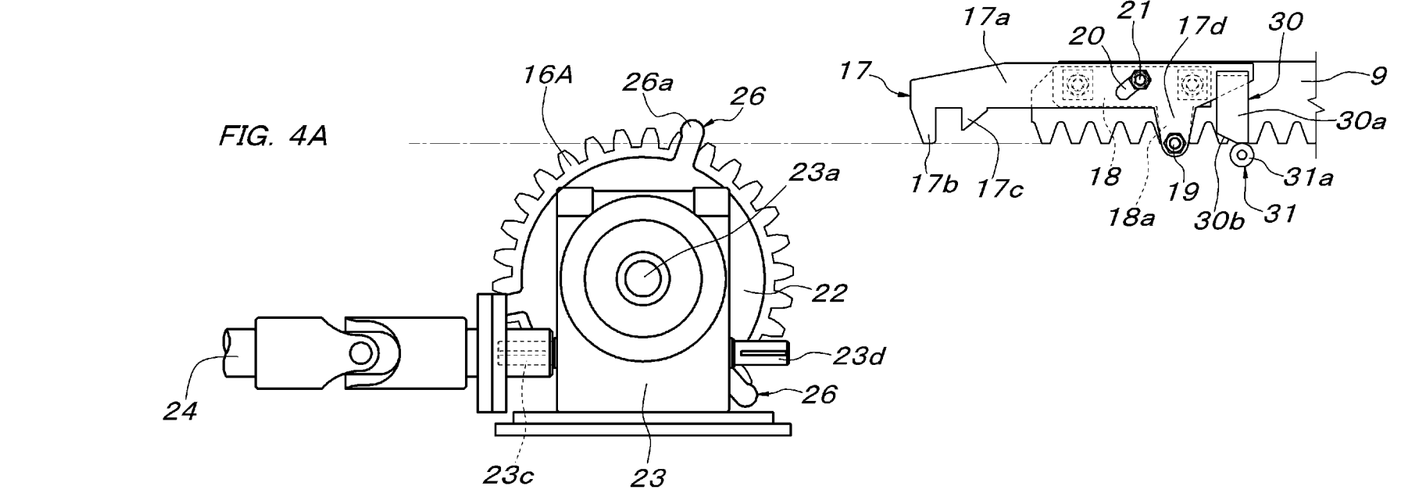
FIG. 4A is a side view for describing the configuration of an entrance drive unit of the rack gear drive section and a rack gear front end portion of the conveying traveling body.
Figure 4B:
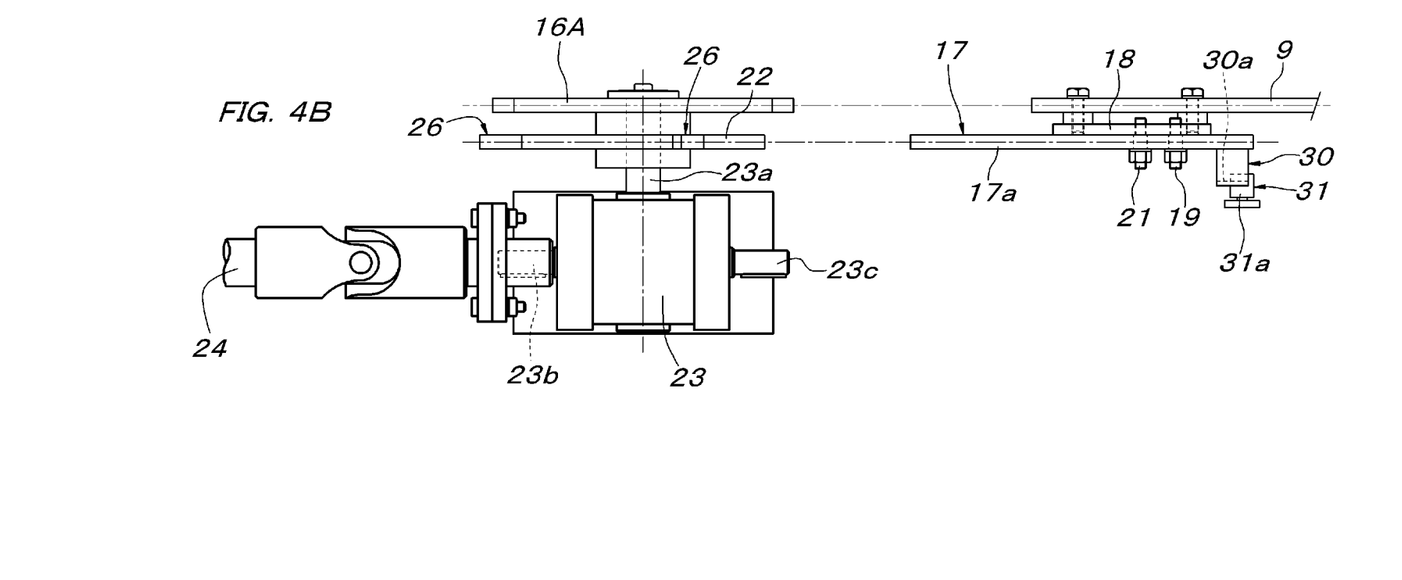
FIG. 4B is a plan view thereof.

As shown in FIG. 1 and FIG. 2, a friction drive section A1 and a rack gear drive section A2, connected to a terminal end of the friction drive section A1, are provided in the traveling route of the conveying traveling body 1 with the above-described configuration. In the friction drive section A1, as is conventionally well known, friction drive units 15, each including a friction drive wheel 15a in press contact with the side surface of the load bar 6 and a driving means 15b that rotatingly drives the friction drive wheel 15a, are disposed, for example, at intervals not longer than the total length RL of the load bar 6. Therefore, in this friction drive section A1, respective conveying traveling bodies 1 can be made to travel at a fixed speed at arbitrary intervals by means of the friction drive wheels 15a in press contact with the side surfaces of the load bars 6 of the respective conveying traveling bodies 1. On the other hand, in the rack gear drive section A2, driving pinion gears 16A and 16 (see FIG. 2) that mesh with the rack gear 9 are disposed, for example, at intervals not longer than the total length GL of the rack gear 9. The respective conveying traveling bodies 1 can thus also be made to travel at a fixed speed at arbitrary intervals in this rack gear drive section A2 by the driving pinion gears 16A and 16 meshing with the rack gears 9 of the respective conveying traveling bodies 1.

As shown in FIG. 4A to FIG. 6B, a towed hook 17 is mounted to a front end of the rack gear 9. The towed hook 17 has a hook portion 17b and an advance preventing claw portion 17c disposed to continue integrally to a front end lower side of a band plate 17a with a width approximately half a height of the rack gear 9, and the advance preventing claw portion 17c is positioned at a rear side of the hook portion 17b, has a downwardly projecting length approximately half of a downwardly projecting length of the hook portion 17b, and forms a rectangular upwardly recessed portion with the hook portion 17b. Also, a side surface shape of the advance preventing claw portion 17c is a right-angled triangular, non-return shape with the hook portion 17b side being vertical. A bearing projection portion 17d is disposed to continue downwardly from a lower side face at a vicinity of a rear end of the band plate 17a that constitutes the towed hook 17. On the other hand, one side surface of a front end portion of the rack gear 9 has a back plate 18 mounted via two bolts and spacers to an upper half portion separated upward from a gear tooth row at its lower side face, and a bearing projection portion 18a is disposed to continue downwardly from a rear end portion of a lower side face of the back plate 18. The towed hook 17 is overlapped with an outer side of the back plate 18 and is pivotally supported on a lower end portion of the bearing projection portion 18a of the back plate 18 so as to be vertically swingable by a right/left horizontally oriented support shaft 19 at a lower end portion of its bearing projection portion 17d, a slot 20, with a shape of an arc centered at the support shaft 19 or a rectilinear shape close thereto, is provided in the band plate 17a at a position further forward than the support shaft 19, and a pin 21 penetrating through the slot 20 is protruded from the back plate 18.

The towed hook 17 is thus held, by a urging force (gravity) acting downwardly around the support shaft 19, at a lower limit action position at which an upper end of the slot 20 is received and retained by the pin 21, and the towed hook 17 can be moved upward, against the downwardly urging force (gravity), to an upper limit retracted position at which a lower end of the slot 20 contacts the pin 21. When the towed hook 17 is at the lower limit action position, the hook portion 17b is at a position overlapping with an extension region of the gear tooth row of the rack gear 9 in side view (see FIG. 4A). Also, a portion of the band plate 17a excluding its hook portion 17b, the advance preventing claw portion 17c, and bearing projection portion 17d, together with a portion of the back plate 18 excluding the bearing projection portion 18a, is disposed further upward than the gear tooth row of the rack gear 9 and is in a horizontal orientation together with the rack gear 9. Although just gravity acting on the towed hook 17 is used as the urging force urging the towed hook 17 downwardly, a spring force may be used in combination as necessary. Further, the band plate 17*a* of the towed hook 17 has a forced return operated portion 30 provided further rearward than the bearing projection portion 17*c*. The forced return operated portion 30 is configured of a cam 30*a*, constituted of an inverted L shaped plate member with an upper end fixed to a side surface of the band plate 17*a* and its lower side face is a cam surface 30*b*.

As shown in FIG. 4A to FIG. 6B, the leading driving pinion gear 16A, which is disposed at an entrance of the rack gear drive section A2 and is for drawing in the conveying traveling body, has a rotating body 22, rotating integrally with the leading driving pinion gear 16A, provided so as to overlap in plan view (see FIG. 4B) with an extension region of the towed hook 17 attached to the rack gear 9. The leading driving pinion gear 16A and the respective subsequent driving pinion gears 16 (see FIG. 2) are respectively mounted to drive shafts 23*a*, each belonging to a worm gear unit 23 and projecting to one side in a right/left orientation. Each worm gear unit 23 includes the drive shaft 23*a*, a single, front/rear oriented transmission shaft with respective ends being input/output shaft portions 23*b* and 23*c*, and a worm gear interlockingly coupling the single transmission shaft and the drive shaft 23*a* to each other and, as shown in FIG. 2, the leading driving pinion gear 16A and the respective subsequent driving pinion gears 16, which are disposed at required intervals in the rack gear drive section A2, are interlockingly coupled so as to rotate mutually interlockingly in the same direction by an interlock mechanism, configured of the worm gear units 23 that include the respective driving pinion gears 16A and 16 and interlock shafts 24 coupling the input/output shaft portions 23*b* and 23*c* to each other, and are configured so that the plurality of driving pinion gears 16A and 16 can be driven interlockingly in synchronization by a single motor 25 connected to the drive shaft 23*a* of a worm gear unit 23A (with which the worm gear unit 23 is used in a right/left reversed orientation) interposed between the interlock shafts 24 in the interlock mechanism.

Each rotating body 22 has a plurality of drawing-in claws 26 protruded from its circumferential edge at equal intervals in a circumferential direction. Each drawing-in claw 26 is provided so that its rotation locus overlaps in side view (see FIG. 4A) with a movement route of the hook portion 17*b* at the towed hook 17 at the front end of the rack gear 9 and includes a head portion 26*a* of circular shape in side view that fits into the rectangular, upwardly recessed portion between the hook portion 17*b* and the advance preventing claw portion 17*c* of the towed hook 17.

Figure 5A:
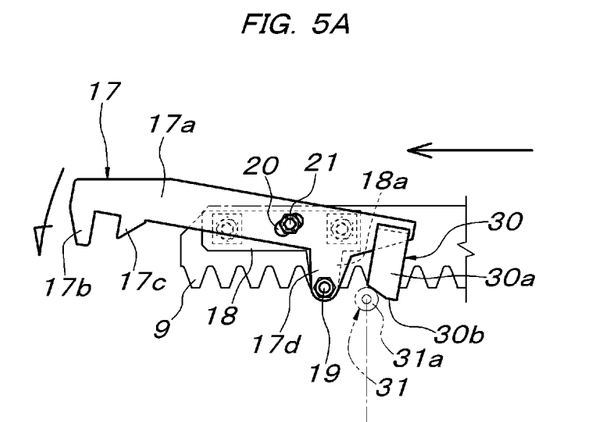
FIG. 5A is a side view for describing a situation where a towed hook, belonging to the conveying traveling body that has arrived in front of the entrance drive unit, is not returned to a lower limit action position.
Figure 5B:
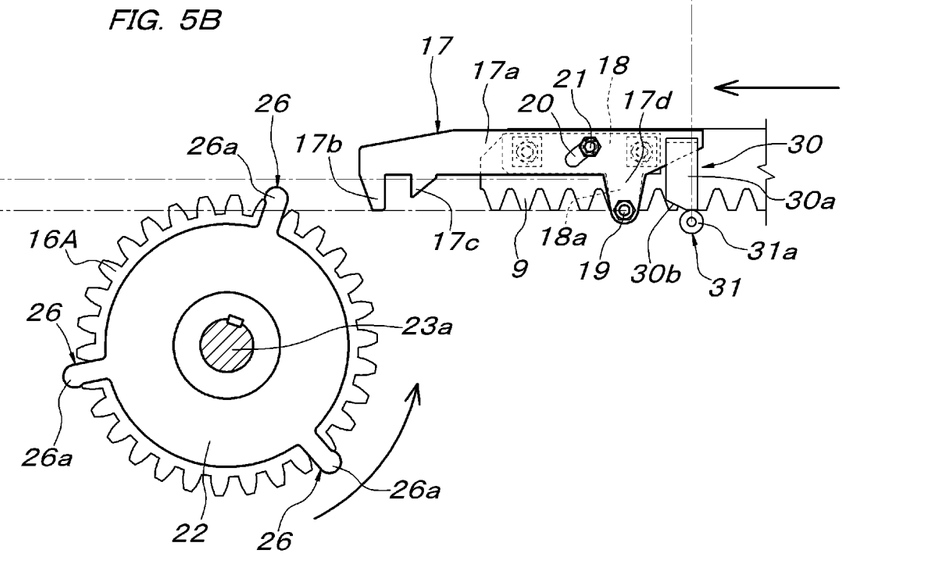
FIG. 5B is a side view showing the towed hook at the lower limit action position and the entrance drive unit.

With the conveying device drivable by rack gear configured as described above, each conveying traveling body 1 on the traveling route travels in the friction drive section A1 at the fixed speed by receiving the friction drive force by the friction drive wheels 15*a* of the friction drive units 15 and is thereafter sent into the downstream rack gear drive section A2 at a prescribed timing by the friction drive wheel 15*a* of the conveying traveling body sending-out friction drive unit 15 disposed in front of an exit of the friction drive section A1, and as shown in FIG. 5A and FIG. 5B, the forced return operating portion 31 for the towed hook 17 of the conveying traveling body 1 that is being sent in is disposed at a fixed distance in front of the leading driving pinion gear 16A disposed at the entrance of the rack gear drive section A2. The forced return operating portion 31 is configured to forcibly return the towed hook 17, being at a non-action position moved upward around the support shaft 19 with respect to the lower limit action position as shown in FIG. 5A, to the lower limit action position at which the upper end of the slot 20 thereof is received and retained by the pin 21 as shown in FIG. 5B and is configured of a roller 31*a* that acts on the cam surface 30*b* of the forced return operated portion 30 to push up a rear end portion of the towed hook 17 in accordance with movement of the rack gear 9 (conveying traveling body 1). Although the roller 31*a* may be at a height at which it rolls in contact with the cam surface 30*b* of the forced return operated portion 30 when the towed hook 17 in the state of being at the lower limit action position passes the forced return operating portion 31 as shown in FIG. 5B, it may also be provided instead at a height of being able to pass relative to the cam surface 30*b* in a state of being separated therefrom across a slight gap.

Figure 6A:
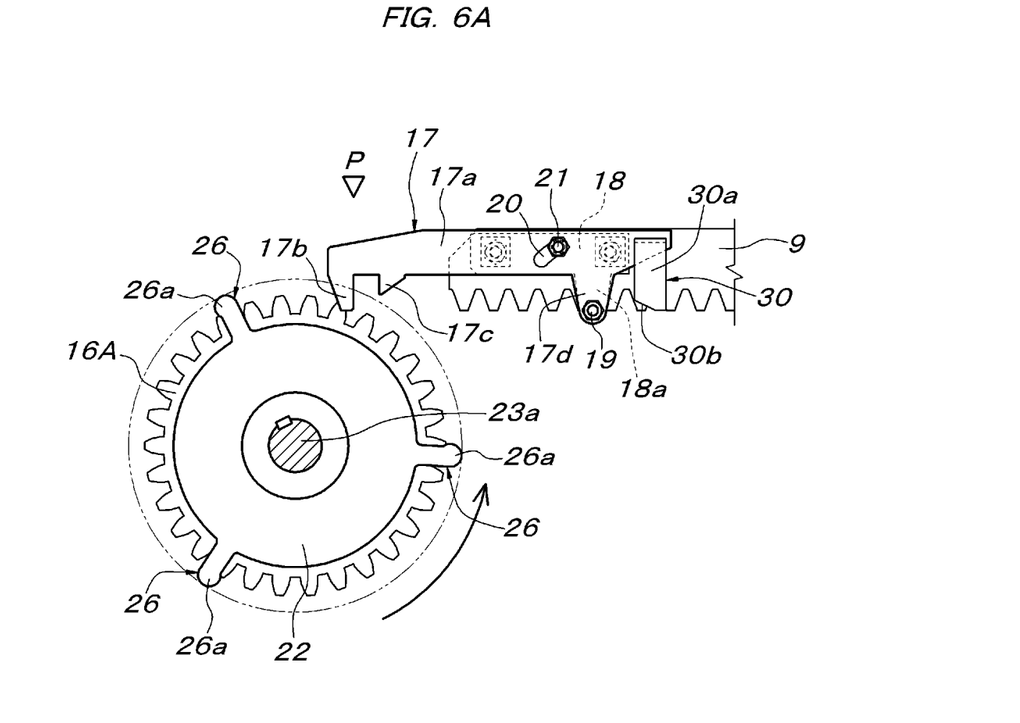
FIG. 6A is a side view showing the towed hook and the entrance drive unit in a first stage in which the conveying traveling body has been sent in up to a prescribed position with respect to the entrance drive unit.

The towed hook 17 of each conveying traveling body 1 that is sent into the rack gear drive section A2 is invariably at the lower limit action position as shown in FIG. 5B, and the conveying traveling body 1 is sent into the rack gear drive section A2 so that the hook portion 17*b* enters inside the rotation locus of the drawing-in claws 26 rotating integrally with the driving pinion gear 16A via the rotating body 22, and the conveying traveling body 1 is stopped at a point of reaching a fixed position P shown in FIG. 6A. Preferably when the conveying traveling body 1 stops at the fixed position P, the hook portion 17*b* of the towed hook 17 has entered inside the rotation locus of the drawing-in claws 26 at a position between two mutually circumferentially adjacent drawing-in claws 26 but the advance preventing claw portion 17*c* at the rear side is in a state of not having yet entered inside the rotation locus of the drawing-in claws 26. The drawing-in claws 26 rotate continuously together with the driving pinion gear 16A so that the head portion 26*a* of a corresponding drawing-in claw 26 contacts the hook portion 17*b* of the towed hook 17 of the conveying traveling body 1, stopped at the fixed position P, from the rear side to begin a rear-pushing drive, and subsequently, the advance preventing claw portion 17*c* is made to enter inside the rotation locus of the drawing-in claws 26 so as to sandwich the head portion 26*a* of the corresponding drawing-in claw 26 with the hook portion 17*b*. Although in this process, the friction drive wheel 15*a* (see FIG. 1 and FIG. 2) of the conveying traveling body sending-out friction drive unit 15 disposed at the exit of the friction drive section A1 is not detached to the rear from the side surface of the load bar 6 of the conveying traveling body 1 stopped at the fixed position P and is in press contact with the side surface of the load bar 6, it is in a freely rotating state and can self-rotate in accompaniment with the traveling of the conveying traveling body 1.

Figure 6B:
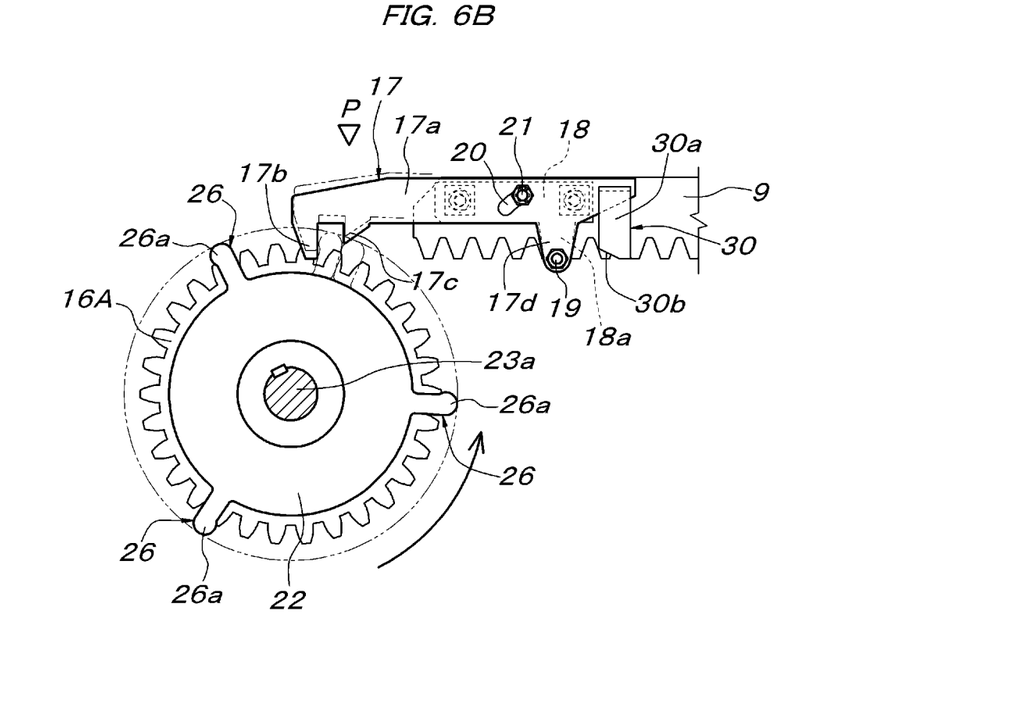
FIG. 6B is a side view showing a state where the conveying traveling body has been sent in up to a position deviated forward from the prescribed position with respect to the entrance drive unit.

Although the conveying traveling body 1 is preferably sent into the fixed position P as shown in FIG. 6A, if the conveying traveling body 1 stops at a position slightly more advanced than the position shown in FIG. 6A, it is possible to assume a case where the advance preventing claw portion 17*c* has entered inside the rotation locus of the drawing-in claws 26 as shown in FIG. 6B. Even when such a situation occurs, the advance preventing claw portion 17*c* has the non-return shape, which, although not being able to ride over and pass the drawing-in claws 26 from the rear, allows passing of the drawing-in claws 26 from the rear, and therefore as indicated by virtual lines in FIG. 6B, a drawing-in claw 26 that moves approachingly to the advance preventing claw portion 17*c* from the rear contacts an inclined surface at a rear side of the advance preventing claw portion 17*c* to move the towed hook 17 upward around the support shaft 19 via the advance preventing claw portion 17*c* and pass below the advance preventing claw portion 17*c*. Although after passing, the drawing-in claw 26 contacts the hook portion 17*b* that is positioned directly in front, it is put in a state of being sandwiched by the hook portion 17*b* and the advance preventing claw portion 17*c* because the towed hook 17 is returned to the original lower limit action position at the same time due to gravity.

The conveying traveling body 1 that has been sent in up to the fixed position P or a position slightly ahead thereof as shown in FIG. 6A or FIG. 6B is thus made to receive thrust from the corresponding drawing-in claw 26 via the towed hook 17 and the rack gear 9 and begin forward travel, and at this point, a location of contact of the head portion 26*a* of the drawing-in claw 26 and the hook portion 17*b* of the towed hook 17 is at a position higher than a height of the support shaft 19 that is a fulcrum of vertical movement of the towed hook 17. Therefore, an upward rotational force around the support shaft 19 will not act on the towed hook 17 due to the forward thrust that the towed hook 17 receives from the drawing-in claw 26 and there is no possibility of the towed hook 17 becoming disengaged upward from the drawing-in claw 26. Also, at the same time as the beginning of rear-pushing of the towed hook 17 by the drawing-in claw 26, the head portion 26*a* of the drawing-in claw 26 enters to a front side of the advance preventing claw portion 17*c* and a situation is entered where the head portion 26*a* of the drawing-in claw 26 is sandwiched by the hook portion 17*b* and the advance preventing claw portion 17*c* of the towed hook 17 so that advancing movement of the towed hook 17 in a manner of separating forward from the drawing-in claw 26 due to inertia at the beginning of rear-pushing of the towed hook 17 by the drawing-in claw 26 is also suppressed reliably.

Figure 7A:
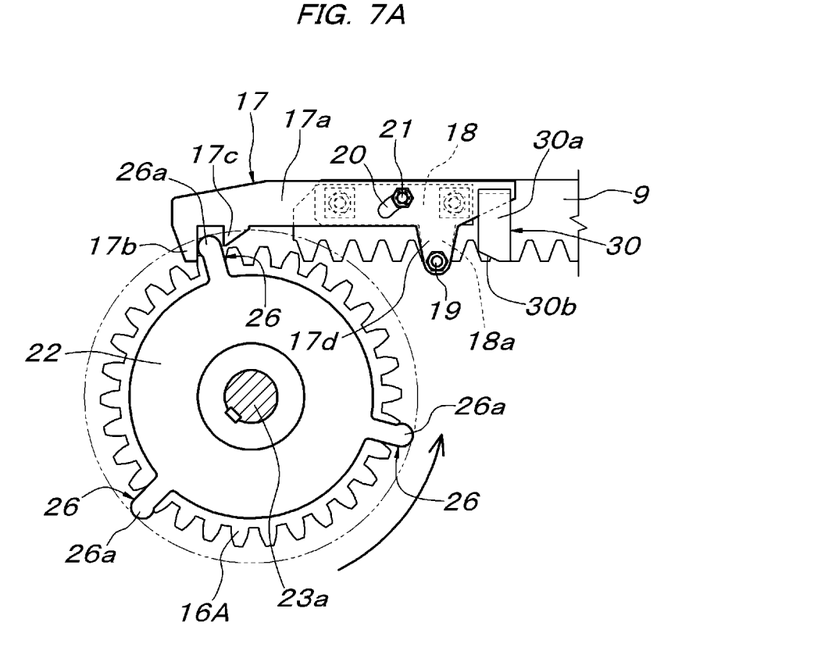
FIG. 7A is a side view showing the towed hook and the entrance drive unit when a second stage is reached and FIG. 7B is a side view showing the towed hook and the entrance drive unit when a third stage is reached.
Figure 7B:
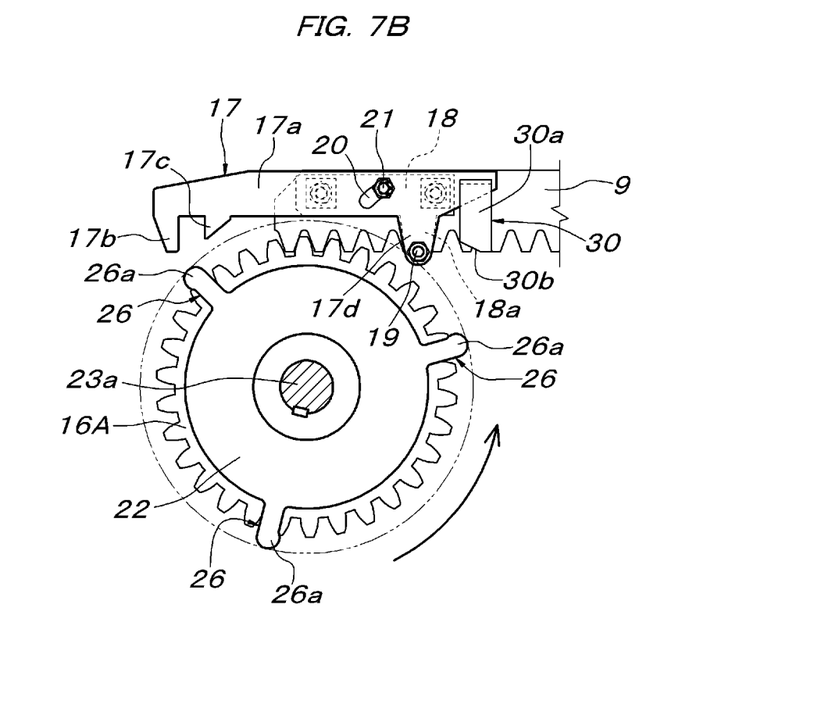

The position of the towed hook 17 with respect to the rack gear 9 is determined so that after the conveying traveling body 1 receives the thrust from the drawing-in claw 26 via the towed hook 17 and the rack gear 9 and begins forward travel, a leading gear tooth of the rack gear 9 is introduced smoothly between gear teeth of the driving pinion gear 16A before the rotating drawing-in claw 26 disengages downward from between the hook portion 17*b* and the advance preventing claw portion 17*c* of the towed hook 17 as shown in FIG. 7A. Therefore, when the rotating drawing-in claw 26 detaches downwardly from between the hook portion 17*b* and the advance preventing claw portion 17*c* of the towed hook 17, the rack gear 9 and the driving pinion gear 16A are completely meshed as shown in FIG. 7B and thereafter, thrust is applied from the driving pinion gear 16A to the conveying traveling body 1 via the rack gear 9 and the conveying traveling body 1 is drawn smoothly into the rack gear drive section A2.

Figure 8A:
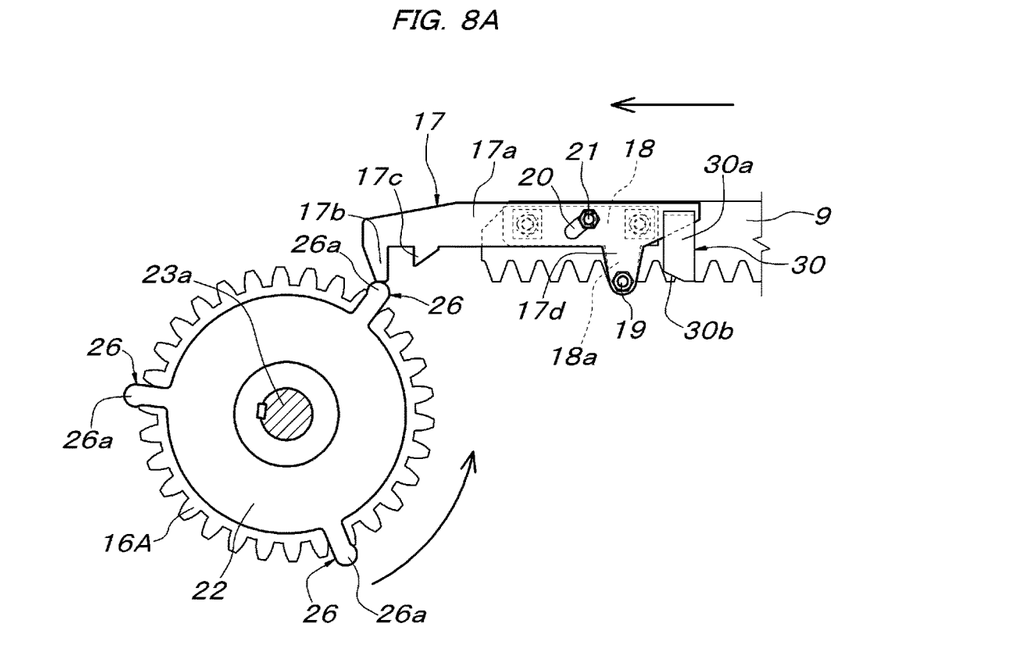
FIG. 8A is a side view for describing an abnormal situation in the second stage.
Figure 8B:
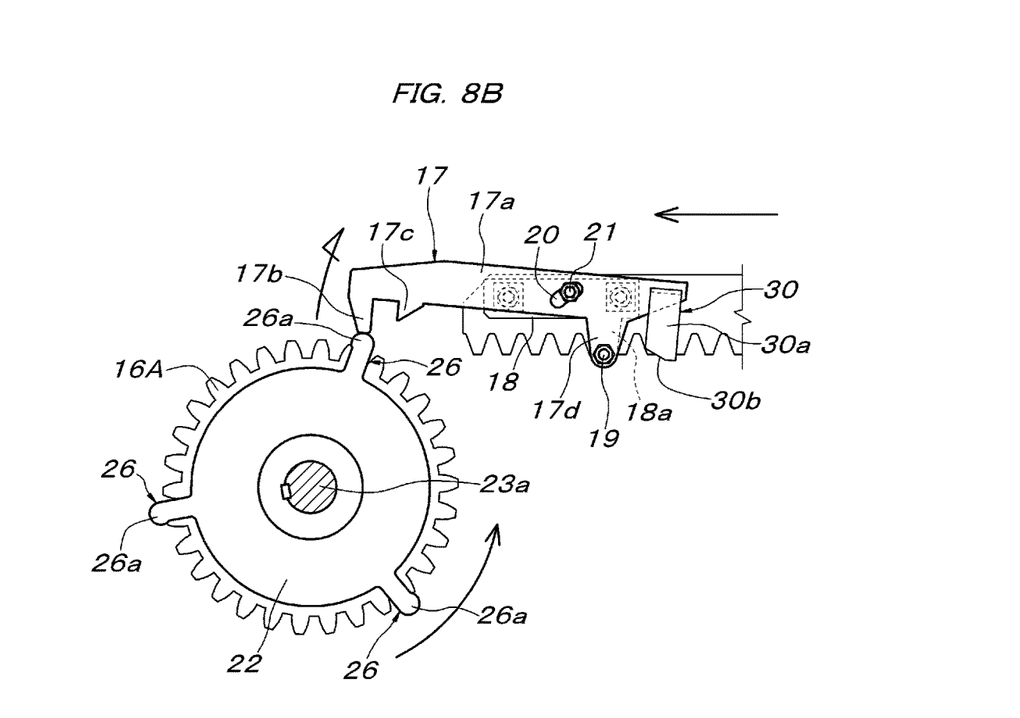
FIG. 8B is a side view of a state when the abnormal situation shown in FIG. 8A is progressed.

A case may also be considered where, due to the sending of the conveying traveling body 1 into the rack gear drive section A2 by the friction drive wheel 15*a* of the friction drive unit 15 disposed at the exit of the friction drive section A1 not being performed at the prescribed timing, a drawing-in claw 26 rotating upward from below collides upward against the towed hook 17 of the conveying traveling body 1 that is being sent into the rack gear drive section A2 as shown in FIG. 8A. When such a situation occurs, the towed hook 17 receiving a pushing-up force from the drawing-in claw 26 swings upward with the support shaft 19 at the rack gear 9 side as the fulcrum against the downwardly urging force (gravity in the present embodiment) acting on the towed hook 17 as shown in FIG. 8B to absorb the pushing-up force received from the drawing-in claw 26 so that an excessive pressing force will not be generated between the two components. In this case, a pushing-up amount with respect to the towed hook 17 reaches a maximum when the drawing-in claw 26 reaches a position directly above a rotational axial center of the rotating body 22 and therefore a circumferential length of the slot 20 that determines a vertical swinging range of the towed hook 17 is determined so that the towed hook 17 can move upward with the support shaft 19 as the fulcrum to an angle at which the towed hook 17 rides on an upper end of the drawing-in claw 26 positioned directly above the rotational axial center of the rotating body 22.

Also, although with the embodiment described above, a layout where the conveying traveling bodies 1 are sent into the rack gear drive section A2 from the friction drive section A1 is adopted, the type of driving of the conveying traveling bodies 1 upstream the rack gear drive section A2 is not restricted to friction drive. In other words, the means of sending the conveying traveling bodies 1 into the rack gear drive section A2 may be any means. Also as shown in FIG. 7A, the bearing projection portion 17*d* projecting downwardly from the band plate 17*a* of the towed hook 17 and the bearing projection portion 18*a* of the back plate 18 are, as is clear in side view (see FIG. 7A) and plan view (see FIG. 4B), at positions at which loci of movement in accordance with the traveling of the corresponding conveying traveling body 1 overlap with or are adjacent to the rotation locus of the drawing-in claws 26 and therefore the number (circumferential interval) of the drawing-in claws 26 protruded at a circumference of the rotating body 22 must be considered so that another drawing-in claw 26 positioned at the rear side of the drawing-in claw 26 engaged with the towed hook 17 will not interfere mutually with the bearing projection portions 17*d* and 18*a*. With the illustrated example, three drawing-in claws 26 are protruded from the rotating body 22 at 120 degree intervals. Also, although with the illustrated example, the hook portion 17*b*, the advance preventing claw portion 17*c*, and the bearing projection portion 17*d* are disposed to continue integrally from the band plate 17*a* of the towed hook 17 and the drawing-in claws 26 are protruded integrally from the rotating body 22, these may be separated from the band plate 17*a* and the rotating body 22 and configured of separate members to provide a configuration where the separate members are mounted to side surfaces of the band plate 17*a* and the rotating body 22.

The conveying device drivable by rack gear according to the present invention can be utilized in an automobile assembly line, etc., as a conveying device with which a conveying traveling body can be driven to travel, just within a specific section in a traveling route of the conveying traveling body, by a rack gear, mounted to the conveying traveling body, and a driving pinion gear, provided at the traveling route side so as to mesh with the rack gear.

What is claimed is:

1. A conveying device drivable by rack gear, comprising:
   a conveying traveling body capable of traveling on a fixed traveling route, the conveying traveling body having a rack gear attached in parallel to a travel direction thereof, and having a towed hook disposed at a position further forward than a front end of the rack gear,
   driving pinion gears disposed in a rack gear drive section, the driving pinion gears being operable to mesh with the rack gear and to propel the conveying traveling body
   a leading driving pinion gear disposed at an entrance of the rack gear drive section, the leading driving pinion gear having a drawing-in claw operable to engage with the towed hook and to draw in the conveying traveling body to a position at which the front end of the rack gear meshes with the leading driving pinion gear, the towed hook having a hook portion at a distal end thereof and further forward than the front end of the rack gear, and having an advance preventing claw portion disposed to a rear of the hook portion, and the advance preventing claw portion together with the hook portion being operable to sandwich the drawing-in claw, and the hook portion having a length such that it enters more deeply inside a rotation locus of the drawing-in claw than the advance preventing claw portion.

2. The conveying device drivable by rack gear according to claim 1, wherein:

the towed hook has a rearwardly extending base end portion pivotally supported by a front end portion of the rack gear, the towed hook is vertically swingable relative to the rack gear within a fixed range and the towed hook has lower limit action position into which the towed hook is urged by a downwardly urging force, and the towed hook is configured so that when the towed hook is disposed at the lower limit action position, the towed hook is operable to be thrusted up by the drawing-in claw at a leading driving pinion gear side to allow passing of the drawing-in claw.

3. The conveying device drivable by rack gear according to claim 1, wherein the advance preventing claw portion has a non-return structure configured to prevent the advance preventing claw portion from riding over and passing the drawing-in claw from a rear of the drawing-in claw but to allow passing of the drawing-in claw from a rear of the advance preventing claw portion.

4. The conveying device drivable by rack gear according to claim 2, wherein the towed hook is pivotally supported to the front end portion of the rack gear by a pivotal support, and a position of the pivotal support is set lower than a height of contact of the hook portion of the towed hook and the drawing-in claw.

5. The conveying device drivable by rack gear according to claim 2, wherein:

the towed hook has a first forced return operated portion, a second forced return operating portion is disposed in the traveling route of the conveying traveling body, and the second forced return operating portion is operable to act on the first forced return operated portion to forcibly return the towed hook to the lower limit action position, when the towed hook portion is not in the lower limit action position, and the second forced return operating potion being operable to act on the first forced return operated portion not later than when the towed hook enters inside the rotation locus of the drawing-in claw.

6. The conveying device drivable by rack gear according to claim 5, wherein the first forced return operated portion has a cam positioned at a lateral side of and further to a rear of the towed hook than the pivotal support of the towed hook with respect to the rack gear, and the second forced return operating portion has a roller operable to push up the cam.

* * * * *